US007384196B2

(12) United States Patent
Binder et al.

(10) Patent No.: US 7,384,196 B2
(45) Date of Patent: Jun. 10, 2008

(54) BEARING COVER FOR A CRANKSHAFT BEARING OF AN INTERNAL COMBUSTION ENGINE

(75) Inventors: Thomas Binder, Kosching (DE); Tobias Markle, Denkendorf (DE)

(73) Assignee: Audi AG, Ingolstadt (DE)

( * ) Notice: Subject to any disclaimer, the term of this patent is extended or adjusted under 35 U.S.C. 154(b) by 681 days.

(21) Appl. No.: 10/491,829

(22) PCT Filed: Oct. 5, 2002

(86) PCT No.: PCT/EP02/11197

§ 371 (c)(1),
(2), (4) Date: Apr. 6, 2004

(87) PCT Pub. No.: WO03/036070

PCT Pub. Date: May 1, 2003

(65) Prior Publication Data

US 2004/0264822 A1 Dec. 30, 2004

(30) Foreign Application Priority Data

Oct. 25, 2001 (DE) ................................ 101 52 156

(51) Int. Cl.
*F16C 9/02* (2006.01)

(52) U.S. Cl. ....................................... 384/434; 384/429

(58) Field of Classification Search ................ 384/428, 384/429, 432–434

See application file for complete search history.

(56) References Cited

U.S. PATENT DOCUMENTS 1,283,803 A * 11/1918 Kirkham ..................... 384/432
1,764,672 A * 6/1930 Herbert ...................... 384/432
2,997,347 A * 8/1961 Bauer ......................... 384/432
4,693,216 A * 9/1987 Ampferer et al. ....... 123/195 R

FOREIGN PATENT DOCUMENTS

| | | |
|---|---|---|
| AT | 407185 B | 1/2001 |
| BE | 345124 | 10/1927 |
| DE | 2153258 | 8/1972 |
| DE | 34 26 208 C1 | 3/1986 |
| DE | 38 15 508 C1 | 8/1989 |
| FR | 1260236 | 3/1961 |
| GB | 843527 | 8/1960 |

* cited by examiner

*Primary Examiner*—William C Joyce
(74) *Attorney, Agent, or Firm*—Novak Druce + Quigg LLP

(57) ABSTRACT

The invention relates to a bearing cover (1) for a crankshaft bearing of an internal combustion engine comprising a bearing shell (2), two screw columns (3,3'), which are located on both sides of the bearing shell (2) and provided for mounting on a bearing block, and comprising a reinforcement (4) of the bearing shell (2) extending between both screw columns (3,3'). The aim of the invention is to optimize a bearing cover (1) of the aforementioned type with regard to its shape whereby attaining a high level of stability with a low weight. To this end, the reinforcement (4) is comprised of two braces (6,6'), which extend diagonally from the area of the upper ends (5,5') of the screw columns (3,3') to the bearing shell (2) and which have an essentially constant cross-section over the length thereof, and comprised of a rib (7) extending on the upper side of the bearing shell (2) from one brace (6) to the other (6').

20 Claims, 2 Drawing Sheets

1 5 9 6 8 BR HR 7 4 6′ 5′ 9′ 3′ BS HS 3 2 10′ 10

BEARING COVER FOR A CRANKSHAFT BEARING OF AN INTERNAL COMBUSTION ENGINE

FIELD OF THE INVENTION

The invention relates to a bearing cover of an internal combustion engine having a bearing shell, two threaded channels mounted on the side of the bearing shell for fastening on a thrust bearing, and two braces of the bearing shell extending between the two threaded channels for fastening on a thrust bearing.

BACKGROUND OF THE INVENTION

A bearing cover such as this is disclosed in DE 34 26 208 C1. For the purpose of weight reduction, this bearing cover is made of a light metal alloy into which a core of a ferrous metal material is introduced, which core is extended to the threaded channels in the area of the crankshaft bearing and also encloses these channels. The brace is configured as a transverse rib between the threaded channels forming a double T shape with the core and having two round openings on the threaded channels. Because of the core, this bearing cover is costly to manufacture and its configuration is not optimized. In particular, the connection of the transverse rib accompanied by introduction of the round openings has not been optimized from the viewpoint of force flow and material complexity and accordingly from that of weight as well.

Consequently, the object of the invention is to optimize a bearing cover of the type indicated in the foregoing with respect to its configuration, in such a way that high stability may be achieved in conjunction with low weight, especially for the purpose of manufacture with a homogeneous material.

SUMMARY OF THE INVENTION

It is claimed for the invention that this object is attained in that the brace consists of two struts of more or less constant cross-section over their lenght extending diagonally from the area of the upper ends of the threaded channels and of a rib which extends from one strut to the other on the upper side of the bearing shell.

In particular, the transverse forces resulting from cranking are optimally absorbed and the smallest possible amount of material is used as a result of the lateral bracing by means of struts of more or less constant cross-section. The forces between the struts are absorbed by bearing shell and rib and, because of the absorption of force by the struts, bracing between struts, bearing shell, and threaded channels is not required. All of the material in this area may be fully conserved, as a result of which more or less triangular openings are formed. In this configuration use of material is restricted to the areas in which action is exerted by the forces occurring during operation. Optimum weight reduction with no loss of rigidity is consequently achieved. As a result, sliding movements between thrust bearing and bearing cover as a result of changing force and temperature loads are prevented to the largest extent possible. Bearing deformation is not impaired despite the weight reduction and the circulation of oil in the internal combustion engine need not be reconfigured, in contrast to the bearing covers of the state of the art. In addition, bearing path deformation, that is, deformation of all bearing shells of the shaft to be driven, is kept low by the rigidity of the profile. The invention makes a very light and efficient bearing cover available, especially for the performance class of more than 100 hp per liter piston capacity, one well-suited for simple and cost-effective production with homogeneous material.

Enhanced developments of the invention incorporate in particular features of optimization by shaping and dimensioning.

Optimum absorption of the transverse forces resulting from cranking is achieved if the struts extend in the direction of the resultant crankshaft forces to be expected; as has already been pointed out, triangular openings resulting in saving of weight are obtained between threaded channels, struts, and the bearing shell. Consequently, there is no rib on the bearing shell in this area. The strut cross-section is preferably dimensioned on the basis of the material and the resultant cranking force to be expected. One advantageous configuration provides that the strut width will correspond more or less to the width of the bearing shell. The width of the struts serves the purpose of providing support for the bearing shell and accordingly higher rigidity.

Optimum dimensioning of the cross-sections of the struts and the rib is achieved when the ratio of the geometric moment of inertia of the struts $I_S$ to the geometric moment of inertia of the rib $I_R$ corresponds to the ratio of the projected helical force $F_S$ of the bolts for fastening the bearing cover to the cranking gear bearing $F_L$.

It is provided that the dimensioning of the height and the width of the struts and the dimensioning of the height and width of the rib are to be derived from the ratio $$K*\left(\frac{I_S}{I_R}\right)=\left(\frac{F_S}{F_L}\right)$$

the constant K being determined on the basis of the material and the resultant crankshaft force to be expected and the geometric moment of inertia of the struts being determined from $$I_S=\left(\frac{B_S*H_S^3}{12}\right)$$

and the geometric moment of inertia of the rib from $$I_R=\left(\frac{B_R*H_R^3}{12}\right)$$

in which, $B_S$=width of strut $H_S$=height of strut $B_R$=width of rib $H_R$=height of rib.

One advantageous configuration of the rib cross-section provides that the rib is to be less than half as wide as the bearing shell and that it is to extend in the center of the latter. A narrow configuration of the rib serves the purpose of high rigidity accompanied by low weight.

As has already been stated, the configuration of the bearing cover claimed for the invention is especially well suited for production from a homogeneous material; preference is to be given to use of cast iron with nodular graphite because of the high wear resistance and the high corrosion resistance.

BRIEF DESCRIPTION OF THE DRAWINGS

The invention is described in detail in what follows on the basis of the exemplary embodiment shown in the drawings, in which.

DETAILED DESCRIPTION OF THE INVENTION

Figure 1:
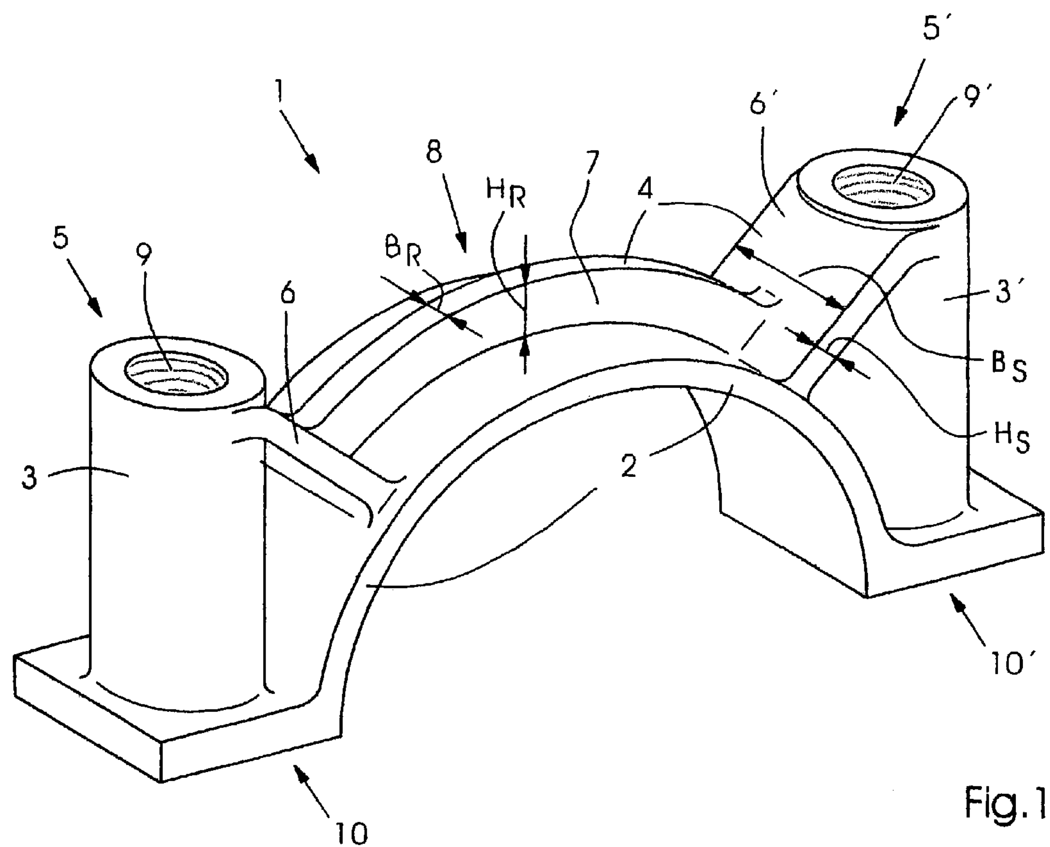
FIG. 1 presents a perspective view of the exemplary embodiment.

FIG. 1 shows a perspective view of an example of embodiment of the bearing cover 1 claimed for the invention. This cover consists of a semicircular bearing shell 2 with straight supports 10, 10' for fastening the bearing cover 1 to a thrust bearing not shown. Threaded channels 3, 3', which are provided with openings 9, 9', extend upward from these supports 10, 10'.

An essential feature claimed for the invention is the configuration of the brace 4, which stabilizes the bearing shell 2 between the two threaded channels 3, 3'. This brace 4 has struts 6, 6' which extend obliquely from the upper area 5, 5' of the threaded channels 3, 3', are connected to the bearing shell 2, and have a height Hs and a width $B_s$. A rib 7 mounted on the top of the bearing shell 2 extends between these struts 6, 6', so that the bearing shell 2 forms with the rib 7 a web 8 extending between the struts 6, 6'. The rib 7 has a width $B_R$ and a height $H_R$.

In order to achieve an optimum force flow with the lowest possible weight, the struts 6 and 6' are oriented in the direction of the resultant cranking force to be expected and are dimensioned on the basis of the material employed and the resultant cranking forces to be expected in accordance with the criteria as set forth in the foregoing.

Figure 2:
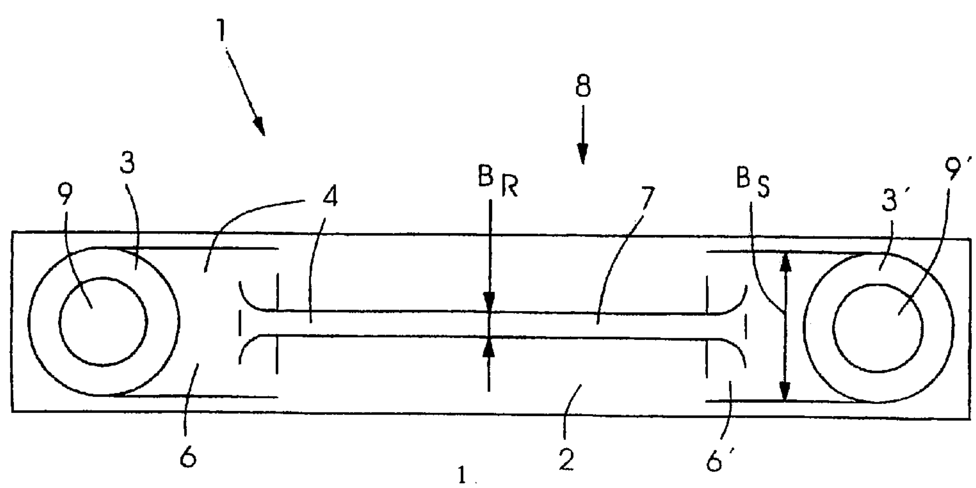
FIG. 2 is a top view of the embodiment shown in FIG. 1.

FIG. 2 presents a top view of the bearing cover 1 claimed for the invention. It is to be seen from this top view that the width $B_S$ of the struts 6, 6' corresponds in approximation to the width of the bearing shell. As a result of this configuration as well a substantially better force flow is achieved between the bearing shell 2 and the threaded channels 3, 3' than with the relatively narrow transverse rib of the state of the art referred to in the foregoing. The drawing also shows the width $B_S$ of the struts 6 and 6' and the width $B_R$ of the rib 7.

Figure 3:
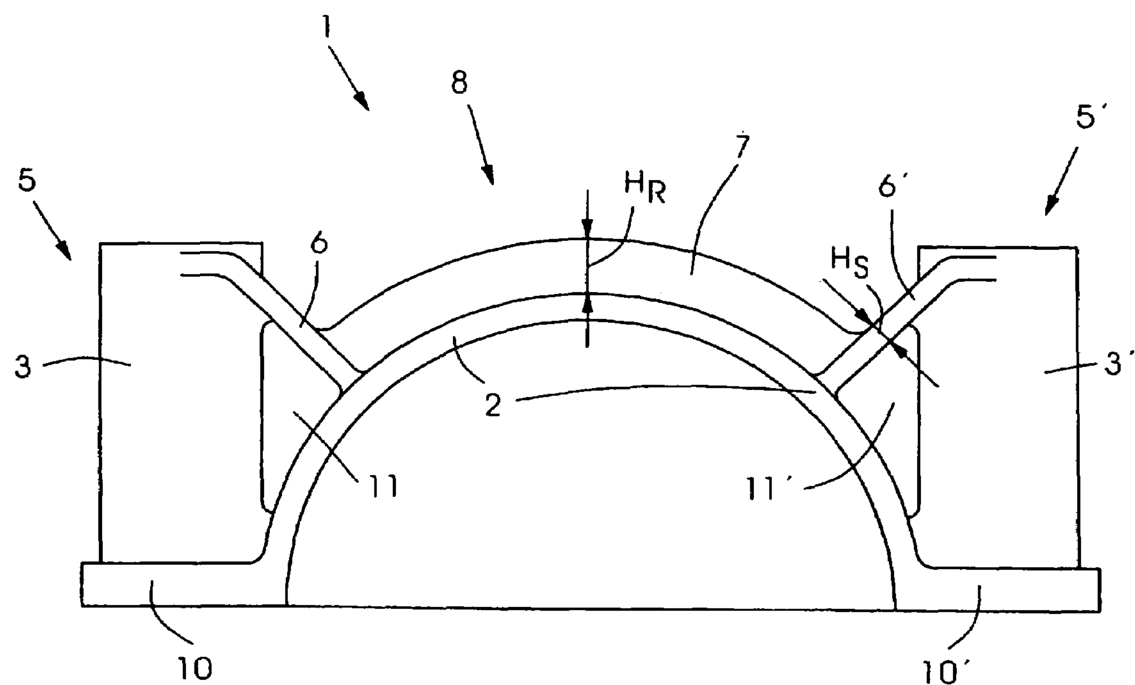
FIG. 3 is a side view of the embodiment shown in FIG. 1.

FIG. 3 presents a side view of the bearing cover 1 claimed for the invention. It is to be seen from this illustration that triangular openings 11, 11' are obtained between the struts 6, 6', the threaded channels, 3, 3', and the bearing shell 2, and accordingly that the bearing shell 2 has no rib 7 for bracing in this area. This configuration serves the purpose of the optimum force flow already referred to, along with maximum weight conservation. This figure also shows the height $H_R$ of the rib 7 and the height $H_s$ of the struts 6, 6'.

Figure 4:
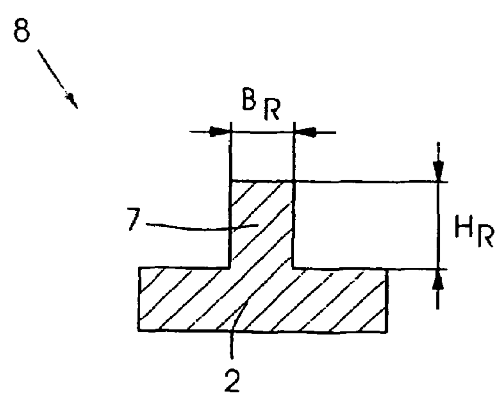
FIG. 4 is a cross-sectional view of the rib shown in the FIGS. 1-3.

FIG. 4 presents a section through this web 8, the height HR and the width BR of the rib 7 being shown, along with the cross-section of the web 8 obtained from the bearing shell 2 and the rib 7 mounted in the center of this bearing shell 2. The rib 7 should be designed to be rather small and high in order to achieve high rigidity accompanied by low weight.

Configurations differing from that of this exemplary embodiment may, of course, also be obtained within the limits of the characteristics specified in claim 1. The configuration illustrated is given exclusively as one example.

LIST OF REFERENCE SYMBOLS

1 bearing cover
2 bearing shell
3, 3 threaded channels
4 brace
5, 5' area of ends of threaded channels
6, 6' struts
7 rib
8 web
9, 9' helical openings
10, 10' supports on thrust bearing
11, 11' triangular openings
$B_S$ width of struts
$H_S$ height of struts
$B_R$ width of rib
$H_R$ height of rib

The invention claimed is:

1. A bearing cover for a crankshaft bearing of an internal combustion engine having a bearing shell, two threaded channels mounted on a side of the bearing shell for fastening on a thrust bearing, and a brace of the bearing shell extending between the two threaded channels wherein the brace consists of two struts extending obliquely from an area of upper ends of the threaded channels to the bearing shell and being of a substantially constant cross-section over their length and wherein a rib interconnects opposed surfaces of said struts and connects to an upper side of the bearing shell.

2. The bearing cover as claimed in claim 1, wherein the struts extend in a direction of a resultant crankshaft force to be expected.

3. The bearing cover as claimed in claim 2, wherein triangular openings are obtained between the threaded channels, the struts and the bearing shell.

4. The bearing cover as claimed in claim 1, wherein triangular openings are obtained between the threaded channels, the struts and the bearing shell.

5. The bearing cover as claimed in claim 1, wherein the strut cross-section is dimensioned on the basis of the material and the resultant crankshaft force to be expected.

6. The bearing cover as claimed in claim 5, wherein the width of the strut is substantially the width of the bearing shell.

7. The bearing cover as claimed in claim 1, wherein the width of the strut is substantially the width of the bearing shell.

8. The bearing cover as claimed in claim 1, wherein the ratio of the geometric moment of inertia of the struts ($I_S$) to the geometric moment of inertia of the rib ($I_R$) corresponds to the ratio of the helical force ($F_S$) applied to the cranking force ($F_L$) to be expected.

9. The bearing cover as claimed in claim 8, wherein the dimensions ($B_S$, $H_S$) of the struts and the dimensions of the rib are obtained from the ratio $$K*\left(\frac{I_S}{I_R}\right)=\left(\frac{F_S}{F_L}\right),$$

the constant (K) being determined on the basis of the material and the resultant crankshaft force to be expected, the geometric moment of inertia of the struts from $$I_S=\left(\frac{B_S*H_S^3}{12}\right)$$

and the geometric moment of inertia of the rib from $$I_R=\left(\frac{B_R*H_R^3}{12}\right),$$

in which $B_S$=width of the struts, $H_S$=height of the struts, $B_R$=width of the rib, and $H_R$=height of the rib.

10. The bearing cover as claimed in claim 9, wherein a cross-section selected for the strut is such that the bearing shell is configured to be as thin as possible and the rib rather high.

11. The bearing cover as claimed in claim 10, wherein the rib is less than half as wide as the bearing shell and extends in the center of the latter.

12. The bearing cover as claimed in claim 9, wherein the rib is less than half as wide as the bearing shell and extends in the center of the latter.

13. The bearing cover as claimed in claim 9, wherein the bearing cover is produced from a homogeneous material.

14. The bearing cover as claimed in claim 9, wherein the bearing cover consists of cast iron containing nodular graphite.

15. The bearing cover as claimed in claim 1, wherein the bearing cover is produced from a homogeneous material.

16. The bearing cover as claimed in claim 15, wherein the bearing cover consists of cast iron containing nodular graphite.

17. A cap for a crankshaft bearing comprising a body including an arcuate portion providing an arcuate, bearing engaging surface and a pair of flange sections providing a pair of substantially radially disposed mating surfaces relative to the axis of curvature of said bearing engaging surface, a pair of housing portions connected to said flange having openings therethrough provided with substantially parallel longitudinal centerlines, a pair of struts, each extending between an interconnecting an upper end of a housing portion and said annular portion, and an annular rib portion interconnecting opposed surfaces of said struts and connected to said first mentioned annular portion.

18. A cap according to claim 17 wherein said strut portions are disposed substantially radially relative to the axis of curvature of said bearing engaging surface.

19. A cap according to claim 17 wherein said rib engages opposed faces of said struts.

20. A cap according to claim 17 wherein each end segment of said rib portion engages not greater than half of the length of an engaged strut.

* * * * *